US006860718B2

United States Patent
Suzuki et al.

(10) Patent No.: US 6,860,718 B2
(45) Date of Patent: Mar. 1, 2005

(54) GEOTHERMAL TURBINE (75) Inventors: Atsuhide Suzuki, Kanagawa-ken (JP); Toshihiro Fujiwara, Kanagawa-ken (JP); Masataka Fukuda, Tokyo (JP); Kazuaki Ikeda, Kanagawa-ken (JP); Toshihiro Matsuura, Tokyo (JP); Osamu Watanabe, Kanagawa-ken (JP); Hisao Fujihashi, Santa Rosa, CA (US); Kentaro Takagi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/351,613

(22) Filed: Jan. 27, 2003

(65) Prior Publication Data

US 2003/0165382 A1 Sep. 4, 2003

(30) Foreign Application Priority Data

Jan. 28, 2002 (JP) ........................................ 2002-018901

(51) Int. Cl.[7] .............................................. F01D 11/02
(52) U.S. Cl. ................................ 415/173.5; 415/173.6; 416/241 R; 416/241 B
(58) Field of Search .......................... 415/173.5, 173.6, 415/174.4, 174.5; 416/241 R, 241 B (56) References Cited

U.S. PATENT DOCUMENTS 3,897,169 A * 7/1975 Fowler ..................... 415/173.6
5,683,226 A * 11/1997 Clark et al. ................... 415/200

FOREIGN PATENT DOCUMENTS

| JP | 61014402 A | * 1/1986 | ........... F01D/11/08 |
| JP | 7-278780 A | 10/1994 | |

* cited by examiner

Primary Examiner—Edward K. Look
Assistant Examiner—Richard A Edgar
(74) Attorney, Agent, or Firm—Foley & Lardner LLP (57) ABSTRACT A geothermal turbine comprises a turbine casing, a turbine rotor shaft, a plurality of nozzle diaphragm outer rings fixed to the turbine casing, a plurality of nozzle diaphragm inner rings located radially inside the nozzle diaphragm outer rings, a plurality of nozzles placed between the nozzle diaphragm outer rings and the nozzle diaphragm inner rings, which form a steam passage, a plurality of rotor blades mounted on the turbine rotor shaft, which face the nozzles and form a blade cascade in a circumferential direction, a shroud arranged on tip of the rotor blade, an overhang attached to the nozzle diaphragm outer ring, which extends downstream of the nozzles and has an inner surface facing radially outside the shroud, and a plurality of sealing fins which protrude radially outward from the shroud and face the overhang.

10 Claims, 8 Drawing Sheets

GEOTHERMAL TURBINE

CROSS-REFERENCE TO RELATED APPLICATIONS

This application is based upon and claims the benefit of priority from the prior Japanese Patent Application No. 2002-18901 filed on Jan. 28, 2002, the entire contents of which are incorporated herein by reference.

BACKGROUND OF THE INVENTION

1. Field of the Invention

This invention concerns a geothermal turbine which prevents aged deterioration and is capable of longer operating life, and a geothermal turbine having turbine components, such as blades, nozzle diaphragms and turbine rotors, are improved in terms of corrosion resistance or erosion resistance.

2. Description of the Related Art

Geothermal steam heated by underground magma is made available by drilling a well, and rotation power of a geothermal turbine is generated by directly introducing this steam as a working fluid into the turbine. Energy of the geothermal steam is changed into kinetic energy in a process of expanding the geothermal steam through turbine stage composed of nozzles and rotor blades, and this kinetic geothermal steam activates the rotor blades and thus generates power to rotate a turbine rotor shaft on which the rotor blades are mounted.

Since the geothermal steam is generated and heated by geothermal sources such as magma, the steam contains corrosive components such as hydrogen sulfide or sodium, scale components such as silicon dioxide or calcium, and solid particles such as sand, mud or ferrous oxide. Since the geothermal steam is fully or almost in a saturated state, the geothermal turbine is forced to operate under severe operating conditions due to high wetness of the steam inside the turbine. Moreover, the variety and consistency of the chemical composition of the geothermal steam, the size and the amount of solids carried into the geothermal turbine, and the steam condition of the geothermal steam, etc. differ by geothermal areas and wells in which the geothermal turbine is installed, and these factors even vary considerably over time even if the wells are same. These differences and aging make the design of the geothermal turbine more complicated.

Since the geothermal steam contains corrosive gas such as hydrogen sulfide, one concerns the factor shortening of the life of the geothermal turbine regarding the rotor blades, the nozzles and the rotor shaft, such as age deterioration and damage resulting from stress corrosion cracking or corrosion fatigue, in addition to corrosion of the materials. For example, generally, damage by the corrosion fatigue occurs as a result of three overlapping factors, namely, the environment, material and stress. It is difficult for the turbine components to avoid the overlapping of these three factors completely, because the rotor blades and the rotor shaft rapidly rotate, and consequently high stress occurs on the turbine components. Thus, subsequently, the material applicable to the geothermal turbine and the length used for geothermal turbine may be limited in a practical aspect, and the output of the geothermal turbine is restricted within a certain upper limit.

As a realistic measure of the geothermal turbine against corrosive environment peculiar to geothermal sources, suitable materials are selected in accordapee with the results of evaluation examination of various candidate materials that are preliminarily held in an atmosphere of the geothermal steam, concurrently with setting the stresses on each part of the geothermal turbine at a level lower than that of an ordinary turbine for thermal power plant, etc. In other words, efforts to reduce the impact from the environment have been performed.

On the other hand, high wetness of the geothermal steam and solid particles carried over in the steam may give rise to the possibility of causing drain (liquid) erosion or particle erosion of the steam passage or sealing portion of each part of the turbine. The wet steam and solid particles, together with the corrosive gas contained in the geothermal steam, may cause synergy of erosion and corrosion and become a factor accelerating damage to the turbine. For this reason, as a measure for preventing the damage, a drain catcher is arranged at the exit of each turbine stage for discharging the water droplets and solid particles outside of the steam passage, and an erosion shielding is attached to the tip of the last stage blade.

In an actual geothermal turbine plant, in spite of such measures for preventing damage to the turbine against aging, severe degradation of each component in the geothermal turbine may nevertheless be observed. Thus, improvement of corrosion resistance and erosion resistance of each component of the geothermal turbine has been an important objective.

To convert thermal energy of geothermal steam into the rotational energy in the geothermal turbine with high efficiency, firstly, it is necessary to flow the working steam into the nozzles and the rotor blades of the geothermal turbine. Since the turbine rotor shaft rotates inside a stationary casing, a gap is required respectively between the rotating blade tips and the stationary nozzle diaphragm outer ring, and between the turbine rotor shaft and the nozzle diaphragm inner ring. It is important to minimize amount of leaked steam bypassing the steam passage through the gaps between stationary and rotating parts.

To minimize the leakage flow through the tips of the rotor blades, a conventional geothermal turbine is equipped with seal fins arranged on an inner periphery of an overhang of the nozzle diaphragm outer ring facing radially outside the shrouds of the rotor blades. This sealing equipment consists of multiple fins and forms a ring. The fins are extended radially inward and narrows the gap between the fins and the shrouds.

A steam sealing structure for preventing leakage of the steam on the rotor shaft is the same as mentioned above, that is, multiple fins arranged on an inner periphery of the nozzle diaphragm inner ring, which is a stationary part facing radially outside a radius of the turbine rotor shaft. These seal fins extend radially inward to narrow the gap between the nozzle diaphragm inner ring and the turbine rotor shaft. As for the sealing structure of the rotor shaft, in many cases, a high-and-low groove is arranged on the turbine rotor shaft to constitute so-called labyrinth seal configuration for additionally enhancing the effect of preventing steam leakage. This labyrinth-seal configuration is also applied to the seal structure of a gland packing portion in which the rotor shaft penetrates the casing.

In both cases mentioned above, it is indispensable for maintaining the efficiency of the geothermal turbine to maintain the steam seal effective without deterioration, wastage or dropout of these steam sealing structures in a geothermal environment.

Figure 11:
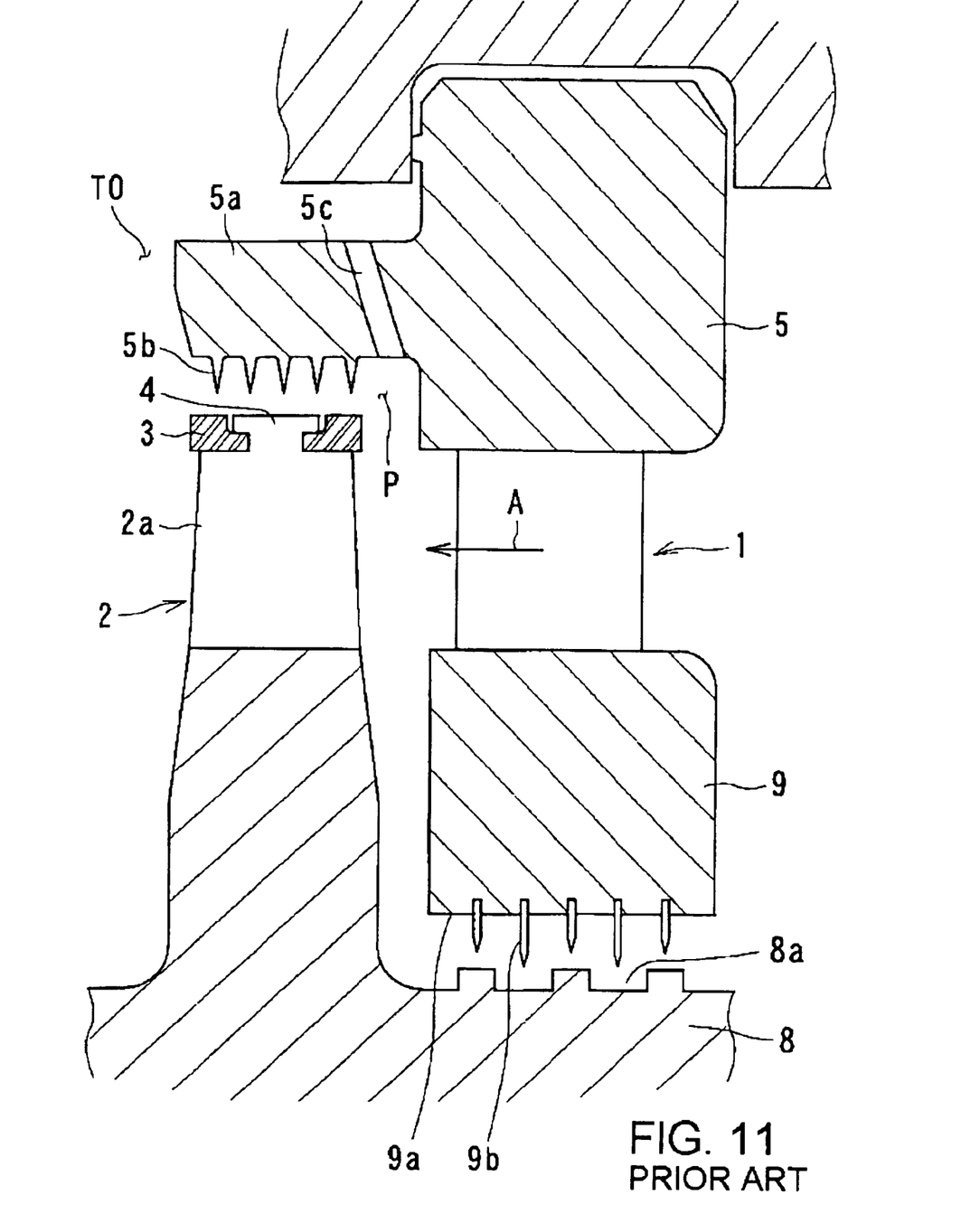
FIG. 11 is a sectional view showing a turbine stage of a typical axial-flow turbine applied to a conventional geothermal turbine.

Generally, for the geothermal turbine, an axial-flow turbine shown in FIG. 11 is adopted. That is, there are a plurality of stages composed of nozzles 1 and rotor blades 2. The rotating blades of the geothermal turbine are composed of a grouped blades structure, that is, a plurality of circumferentially-arranged blades 2a are connected by a shroud 3 for preventing vibration of the rotor blades 2 excited by high-speed steam discharged from the nozzles 1. These grouped blades effectively controls stress due to vibration generated by the steam rotating in the geothermal turbine within an acceptable level. These grouped blades are composed by fitting tenons 4 each arranged on, and coupled with, each of the rotor blades 2, respectively, into respective holes penetrating the shroud 3, for mortising the tenon 4 into the shroud 3, and thereby the plurality of blades 2a and the shroud 3 are connected together.

However, if a top of the tenon 4 of each blade tip 2a of the rotor blades 2 protrudes over the shroud 3, that is, protrudes raadially out of the shroud 3, it may be eroded and/or corroded by drain of the geothermal steam or the solid particles, and thus the life of the rotor blades 2 may become short. To prevent loss of the life of the rotor blade, as one example, a recessed tenon may be arranged so as not to protrude the tenon 4 over the upper surface of the shroud 3, and in addition, multiple seal fins 5b may be arranged on an overhang 5a of a nozzle diaphragm outer ring 5 opposed to the shroud 3, for forming a structure for preventing steam leakage at the blade tip. Thus, this structure for preventing steam leakage at the blade tip improves erosion and corrosion resistance of the tenon.

Moreover, for turbine stages operating in a severely corrosive environment such as in a geothermal turbine, fatigue strength of the rotating parts such as the blades and rotor materials is significantly decreased due to corrosion. The decrease of the fatigue strength of the blade materials, etc., directly affects the life of the blade relating vibration.

As mentioned above, the blade vibration stresses excited by steam forces are suppressed by the group structure. However, when the fatigue strength of the turbine materials significantly decreases under the corrosive environment, and thus making difficult to keep vibration stresses below the material fatigue limit, it is hard to avoid the risk of age damage coming from corrosion fatigue. To minimize this risk, the blade width may be preliminary arranged broader for increasing its rigidity. In this case, since the weight of the blade increases and thereby stresses of the blade fixation and rotor wheel increase, as a result, there occurs another aspect of risk such as stress corrosion cracking on the blade fixation, etc.

Figure 12:
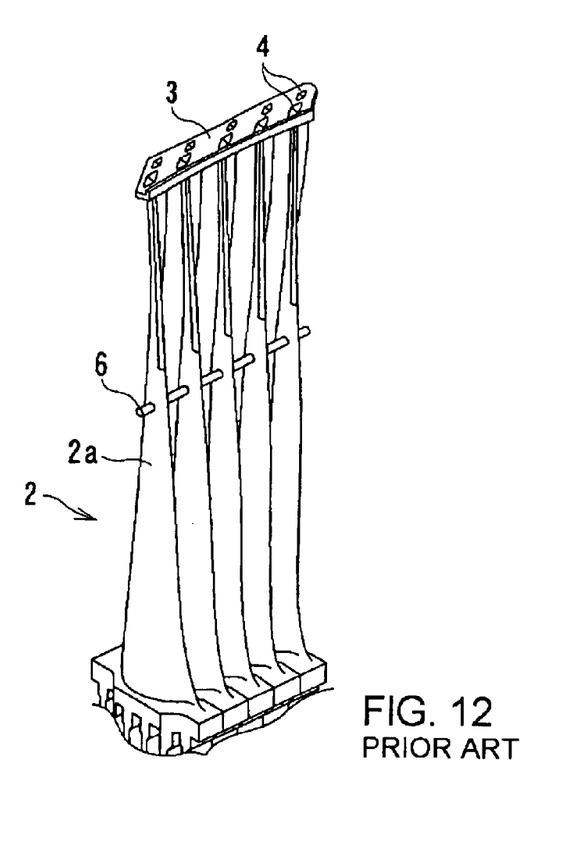
FIG. 12 is a schematic view showing a connection structure of rotor blades of a conventional turbine.

When a geothermal turbine is operated at low load, the last stage blade operates far from its aerodynamic design point with a substantially reduced output and pressure drop across the stage. This will cause nonsteadiness of the flow field with large back flow. The nonsteady turbulent flow around the last stage of the geothermal turbine acts on the blade as a strong exciting force, and thus the last stage blade needs a damping structure which is more effective than that of an ordinary turbine stage. For this reason, in many cases, in addition to the tenons 4 and the shroud 3 on the tip of the rotor blade 2, a coupling member called a lacing wire 6 is arranged in the middle of the blade as shown in FIG. 12. This lacing wire 6 is constituted by leading a wire through holes penetrating the blade and brazing them to each other, or by simply leading a wire through the holes as loose coupling. Generally, from the viewpoint of the damping effect of the blade, the loose coupling is superior to brazing.

Figure 13:
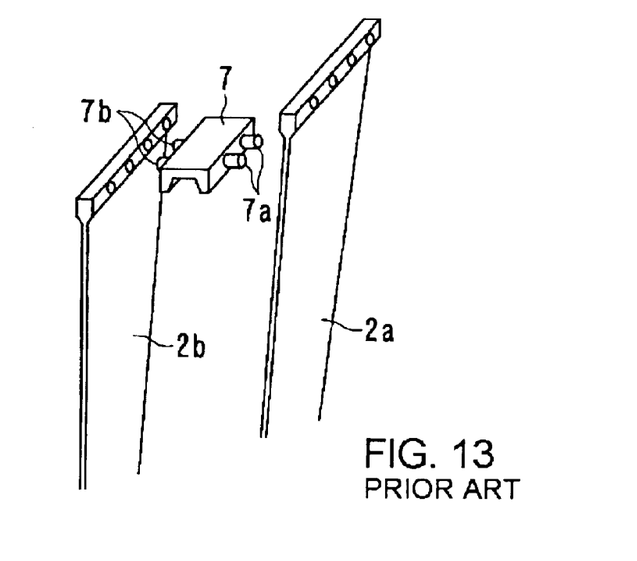
FIG. 13 is an exploded schematic view showing a connection structure of rotor blades of a conventional turbine.

In the thermal power turbines, a cover piece 7 may be arranged separately from the blades 2a, 2b at the blade tip as shown in FIG. 13, taking advantage of the excellent damping characteristics of the loose coupling. In this figure, the tenons 7a, 7b are protruded from opposite side faces of a rhombic cover piece 7, respectively, and one tenon 7a is inserted into a tenon hole bored at one blade tip for fixed joint, and the other tenon 7b is inserted into another tenon hole of the adjacent blade for loose coupling. Thus, this structure allows a small movement between the blades 2a, 2b and the cover piece 7. Sequential connection of adjacent blades 2a, 2b, . . . , through cover pieces loosely around the wheel constitutes continuous coupling of the blades 360 degrees and this continuous coupling provides excellent damping effect.

However, under a severe corrosive environment of the geothermal turbines, corrosive components deposited around the wire hole arranged or the tenon hole may easily become a trigger of stress corrosion cracking and corrosion and fatigue. Therefore, it is difficult to adopt this loose coupling connection structure to the geothermal turbine.

In the inlet stages of the geothermal turbines where the blade lengths are relatively short, natural frequencies of the grouped blades are chosen so as to avoid resonance with the nozzle passing frequency (NPF). NPF, which is the product of the number of nozzles and the rotational frequency of the shaft, is one of the excitation frequencies of the steam discharged from the nozzle. To avoid the resonance completely, this NPF is usually set above the lower modes of the natural frequencies of the grouped blades. The natural frequencies of such short blades are relatively high, and consequently, NPF must be set higher, resulted in a large number of nozzles.

Since the number of nozzles is inversely proportional to a size of the nozzles, the dimension size of the nozzle of these turbine stages becomes small. Arranging small nozzles for the turbine stages with short blade heights provides larger aspect ratio, that is the blade height divided by the blade width, and which might have better influence on stage efficiency. On the other hand, in this case, there is the disadvantage that resistance may be lowered against deterioration and damages inherent to the geothermal turbine, such as damages due to solid particle erosion, deterioration caused by corrosive components, and scale deposit.

The steam flow at the nozzle exit of geothermal turbines has a large circumferential velocity component. As the nature of geothermal turbines, when steam includes droplets (liquid components) and solid particles, a centrifugal force shifts them radially outward. As shown in FIG. 11, sealing fins 5b arranged at the overhang of the nozzle diaphragm outer ring may dam the particles centrifuged aside. However, because the strong circumferential velocity dominates in this portion, the droplets and the solid particles repeatedly circulate in a narrow pocket P surrounded by the outlet of the nozzle and the sealing fins 5b. Consequently, this pocket P may be greatly scooped out by erosion or the sealing fins 5b may drop out. The possibility of this risk becomes high when geothermal steam includes a lot of solid particles, and this is one of the main factors possibly adversely affecting the reliability of the geothermal turbine.

In order to avoid this disadvantage, some through holes 5c are arranged in a circumferential direction, connecting an exit of the stage with the pocket P surrounded by the nozzle exit and the sealing fins 5b. However, when the number of the holes 5b is small, the particles cannot be discharged completely, and conversely, when the number is large, an amount of an associated steam bypassing the rotor blade 2 increases, and thereby decreasing the efficiency of the turbine, which may cause a problem.

The problem of damage by the erosion or corrosion of a steam sealing portion of the geothermal turbine occurs not only at the blade tip, but also in a steam sealing portion between the turbine rotor shaft 8 and the nozzle diaphragm inner ring. Since the intensive rotational flow of the nozzle exit dominates also in this portion, the droplets and the solid particles may damage fins 9b arranged on a nozzle diaphragm side, and thereby the efficiency of the turbine often decreases.

Moreover, a labyrinth seal by arranging a high-and-low groove 8a on the rotor shaft 8, is adopted for raising sealing effectiveness, and that is the same steam sealing structure of gland packing portion in which the rotor shaft penetrates a turbine casing. However, the steam flows through this labyrinth portion with high velocity including droplets, solid particles and corrosive components as mentioned above, and thus the high-and-low groove 8a will be shaved off over time.

In any event, maintaining long-term reliability or extension of a life span of the steam sealing performance between a rotating portion and a stationary portion is one of the issues which should be solved for a geothermal turbine.

On the other hand, for the turbine inlet stages, relatively small nozzles, having a throat width at the nozzle exit of 5 to 8 millimeters, are adopted. Usually, a strainer is installed in the inlet portion of the geothermal turbine, so as not to entrain large solid particles into the turbine. On the other hand, depending on conditions of a well of the geothermal site, such a strainer frequently becomes plugged up, and cleaning of the strainer is often required. Thus, unavoidably, course or large meshes, for example, two meshes per inch, may be used. These rough meshes may cause a partial blockage of the nozzle throat due to solid particles passed through the meshes, and thereby the output of the turbine may decreases significantly. And even if the nozzle throat is not blocked, the throat becomes narrow due to scale deposits on the nozzle surfaces, and thus the output may decrease.

Furthermore, when corrosion or pitting corrosion occurs on a surface of the nozzle, the efficiency may be extensively affected. Especially, corrosive elements are active at steam conditions of inlet stages of the geothermal turbine, and thus this portion is easily affected by corrosion and/or pitting corrosion (erosion), whereby the surface roughness of both nozzle and blade may become severely deteriorated. Since the efficiency drop due to deteriorated surface roughness of nozzle and blade is related to a relative value of the roughness against blade size, the smaller the nozzle or blade is, the more extensive the influence becomes.

In addition, for a small nozzle, there is also a problem of damage on the surface of the nozzle due to solid particles. Since the rate of curvature becomes large as for a smaller nozzle, the solid particles cannot follow the rapid turning of the stream because of inertia and collide with nozzle surfaces. Consequently, a thin outlet portion of the nozzle profile may be damaged and the nozzle profile may be extensively deformed, whereby the efficiency may decline. When the damage is large, an accompanying exciting force against the rotor blades becomes excessive, and the reliability of the rotor blades itself is also affected.

Moreover, since geothermal resources are limited, partial load operation is occasionally carried out during nighttime hours, when electric power demand is lower. Such a style of operation is required especially when the underground resource of the steam tends to be exhausted due to long-running service. At low load, the last stage blade operates far from its aerodynamic design point with a substantially reduced output and pressure drop across the stage. This will cause the flow field to be unsteady with large back flow. This unsteady reversed flow spreads widely as the load decreases, and the exciting forces on the blade become more intensive, resulting in large intensive vibrating stresses in the blade.

If the vibration stresses on a stress concentrated portion, such as blade connection, corrosion pits or erosion pits, exceed the fatigue strength of materials which has been decreased under the corrosive environment, there arises the possibility of cracking as the worst case. Thus, the reliability of geothermal turbines used for cycling load operation depends on how the vibration stresses of the last stage blade could be suppressed applying effective damping structure.

SUMMARY OF THE INVENTION

In consideration of the above-mentioned situation, and one object of this invention is to provide a geothermal turbine having improved resistance against corrosion and erosion of components, such as rotor blades, nozzles and turbine rotors, which are operated in severe geothermal steam environment, and having an extended life span by applying effective countermeasures against age deterioration.

Another object of this invention is to provide a geothermal turbine that prevents the steam sealing structure formed between a stationary portion such as a nozzle diaphragm and a rotating portion such as rotor blades from mechanical damages due to impurities contained in the geothermal steam, and effectively prevents breakage and damage of components of the turbine, to thereby keep stable turbine performance for a long term.

Another object of this invention is to provide a geothermal turbine exhibiting improved maintainability of turbine components operated under a severe geothermal environment, to thereby sustain the turbine components and performance easily.

Other and further objects of this invention will become apparent upon an understanding of the illustrative embodiments to be described herein or will be indicated in the appended claims while various other advantages not referred to herein will become apparent to one skilled in the art upon employment of the invention in practice.

According to one aspect of the present invention, there is provided a geothermal turbine, comprising, a turbine casing, a turbine rotor shaft, a plurality of nozzle diaphragm outer rings fixed to the turbine casing, a plurality of nozzle diaphragm inner rings located radially inside the nozzle diaphragm outer rings, a plurality of nozzles placed between the nozzle diaphragm outer rings and the nozzle diaphragm inner rings, which form a steam passage, a plurality of rotor blades mounted on the turbine rotor shaft, which face the nozzles and form a blade cascade in a circumferential direction, a shroud arranged on tip of the rotor blade, an overhang attached to the nozzle diaphragm outer ring, which extends downstream of the nozzles and has an inner surface facing radially outside the shroud, and a plurality of sealing fins which protrude radially outward from the shroud and face the overhang.

According to another aspect of the present invention, there is provided a geothermal turbine, comprising, a turbine casing, a turbine rotor shaft, a plurality of nozzle diaphragm outer rings fixed to the turbine casing, a plurality of nozzle diaphragm inner rings located radially inside the nozzle diaphragm outer rings, a plurality of nozzles placed between the nozzle diaphragm outer ring and the nozzle diaphragm inner ring, which form a steam passage, and a plurality of rotor blades mounted on the turbine rotor shaft, which face the nozzles and form a blade cascade in a circumferential direction, wherein the nozzle diaphragm inner ring includes high-and-low sealing fins protruding from an inner surface of the nozzle diaphragm inner ring toward the turbine rotor shaft radially inward, and the turbine rotor shaft includes a high-and-low groove corresponding to the high-and-low arrangement of the sealing fins.

According to still another aspect of the present invention, there is provided a geothermal turbine, comprising, a turbine casing, a turbine rotor shaft, a plurality of nozzle diaphragm outer rings fixed to the turbine casing, a plurality of nozzle diaphragm inner rings located radially inside the nozzle diaphragm outer rings, a plurality of nozzles placed between the nozzle diaphragm outer rings and the nozzle diaphragm inner rings, which form a steam passage, a plurality of rotor blades mounted on the turbine rotor shaft, which face the nozzles and form a blade cascade in a circumferential direction, and a strainer installed at an inlet of the turbine, wherein a throat is formed between adjacent nozzles, having a width larger than a mesh size of the strainer, and at least a part of a surface of the nozzle is coated or overlay welded with a protective material.

According to still another aspect of the present invention, there is provided a geothermal turbine, comprising, a turbine casing, a turbine rotor shaft, a plurality of nozzle diaphragm outer rings fixed to the turbine casing, a plurality of nozzle diaphragm inner rings located radially inside the nozzle diaphragm outer rings, a plurality of nozzles placed between the nozzle diaphragm outer rings and the nozzle diaphragm inner rings, which form a steam passage, and a plurality of rotor blades mounted on the turbine rotor shaft, which face the nozzles and form a blade cascade in a circumferential direction, wherein the rotor blade includes a plurality of cover pieces connecting tip portions of adjacent blades, each cover piece including a first tenon protruding from one side of the cover piece and a first tenon hole on opposite side of the cover piece, the first tenon being inserted into a second tenon hole arranged on a tip portion of a first blade, and a second tenon protruding from a second blade next to the first blade being inserted into the first tenon hole, whereby the blade is continuously coupled 360 degrees around the wheel.

According to still another aspect of the present invention, there is provided a geothermal turbine, comprising, a turbine casing, a turbine rotor shaft, a plurality of nozzle diaphragm outer rings fixed to the turbine casing, a plurality of nozzle diaphragm inner rings located radially inside the nozzle diaphragm outer rings, a plurality of nozzles placed between the nozzle diaphragm outer rings and the nozzle diaphragm inner rings, which form a steam passage, and a plurality of rotor blades mounted on the turbine rotor shaft, which face the nozzles and form a blade cascade in a circumferential direction, wherein each rotor blade is coupled with a plurality of cover pieces connecting tips of adjacent blades, each cover piece including tenon holes on both sides of the cover pieces, a first tenon protruding from a first blade being inserted into the tenon hole of the cover piece; a second tenon protruding from a second side adjacent to the first blade being inserted into the tenon hole of the opposite side of the cover piece, whereby the blade is continuously coupled 360 degrees around the wheel.

BRIEF DESCRIPTION OF THE DRAWINGS

A more complete appreciation of the invention and many of the attendant advantages thereof will be readily obtained as the same becomes better understood by reference to the following detailed description of preferred embodiments, when considered in connection with the accompanying drawings wherein.

DETAILED DESCRIPTION OF PREFFERED EMBODIMENTS

Referring now to the drawings, wherein like reference numerals designate identical or corresponding parts throughout the several views, preferred embodiments of a geothermal turbine in this invention will be described below.

First Embodiment

Figure 1:
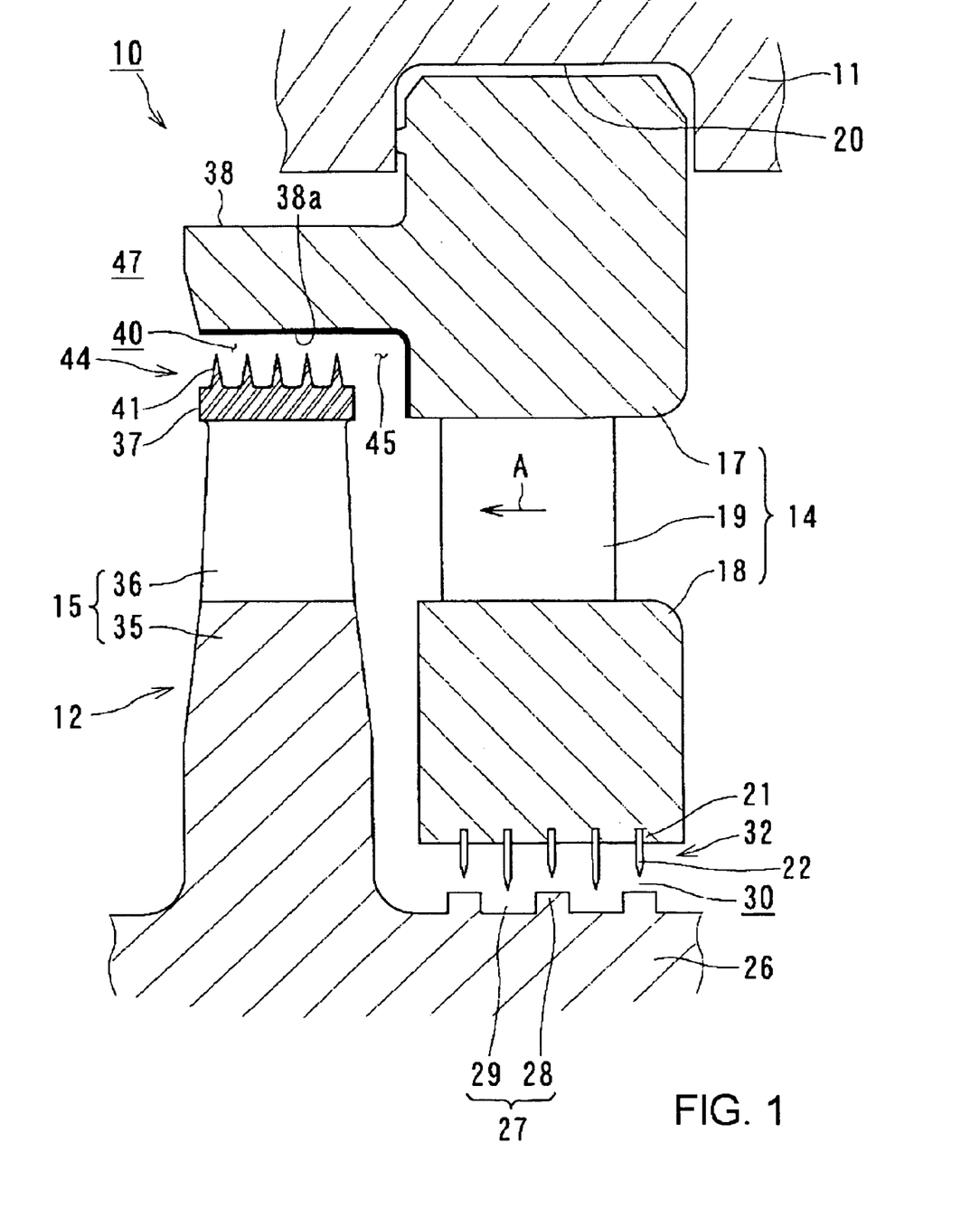
FIG. 1 is a sectional view showing a turbine stage of a geothermal turbine of a first embodiment in this invention.

FIG. 1 is a sectional view showing a turbine stage of an axial-flow turbine, typically applied to a geothermal turbine, of a first embodiment in this invention. A geothermal turbine 10 has turbine stages 12 concentrically arranged as structure of a plurality of stages in a turbine casing 11. Each turbine stage 12 is constituted by combining a nozzle diaphragm outer ring 17, a nozzle diaphragm inner ring 18 positioned inwardly in a radial direction of the nozzle diaphragm outer ring 17, nozzles 19 arranged between the nozzle diaphragm outer ring 17 and the nozzle diaphragm inner ring 18, and rotor blades 15 arranged downstream of and opposite to the nozzles 19. The nozzle diaphragm outer ring 17 is contained and fixed in an inner peripheral slot 20 arranged on the inner face of the turbine casing 11.

Each nozzle 19 constitutes a steam passage portion, and meanwhile, a plurality of sheets of nozzles 19 are arranged in a line in a circumferential direction between the nozzle diaphragm outer ring 17 and the nozzle diaphragm inner ring 18, and form a nozzle cascade. Sealing fin attachment portions 21 are formed in the inner periphery of the nozzle diaphragm inner ring 18 and a plurality of sealing fins 22, in the form of rings or washers, are attached to the sealing fin attachment portions 21 appearing comb-like in section, constituting a packing portion.

A high-and-low groove 27 is arranged on an outer surface of the turbine rotor shaft 26, facing the sealing fins 22 of the nozzle diaphragm inner ring 18. The high-and-low groove 27 is formed on the entire circumference of the rotor shaft 26 and is composed of a plurality of convex portions 28 extending along a circumferential direction and a plurality of concave portions 29 arranged between the convex portions 28. A minute gap 30 is formed between the sealing fins 22 on the nozzle diaphragm inner ring 18 and the high-and-low groove 27 of the turbine rotor shaft, and this minute gap constitutes a steam sealing portion 32 of a labyrinth type. This steam sealing portion 32 enables the structure to prevent steam leakage along the turbine rotor shaft 26.

As for the steam sealing portion 32, a tip of each comb-like sealing fin 22 is staggered, that is, a sealing fin 22 facing the concave portion 29 of the high-and-low groove 27 protrudes toward the turbine rotor 26 side longer than a sealing fin 22 facing the convex portion 28. Herewith, the gap 30 formed between the sealing fin attachment portion 21 of the nozzle diaphragm inner ring 18 and the turbine rotor shaft 26 could be minute, and steam leakage can be effectively prevented by arranging the flow passage formed by the gap 30 to be staggered and long, to enlarge passage resistance of the steam sealing portion 32 of a labyrinth type.

Rotor blades 15 constituting the turbine stage 12 are arranged on the turbine rotor shaft opposed to, and downstream of, the nozzle portion 14. Rotor blades 15 comprise a plurality of blades 36 mounted circumferentially on a disk 35 of the turbine rotor shaft 26, and a shroud 37 is arranged at the tip of each of the blades 36. The shroud 37 combines and unites several numbers of the blades 36, and thus constitutes a group of blades. Above the blades 36, an overhang 38 is located with extending downstream from the nozzle diaphragm outer ring 17. The blades 36 constitute a steam passage, and meanwhile, rotate inside the overhang 38 of the nozzle diaphragm outer ring 17, whereby a gap 40 is formed between the shroud 37 on the tip of the blades 36 and the overhang 38 opposed to radially outside the shroud 37.

Some of the steam does not pass through the blades 36 and leaks through this gap without working. To prevent this leakage, a plurality of sealing fins 41 are arranged as a comb-like in section on the outer surface of the shroud 37 along a circumferential direction extending radially outward toward the overhang 38 of the nozzle diaphragm outer ring 17. Thus, a steam sealing portion of the tip of the rotor blade is formed with keeping a gap 40 small between the tip of the sealing fins 41 and the inner surface of the overhang 38 of the nozzle diaphragm 17. This steam sealing portion 44 forms a structure preventing steam leakage on the tip of the rotor blade.

Steam flow is shown in FIG. 1 as an arrow A. The nozzles 19 constituting a steam passage are located upstream of the rotor blades 36 for deflecting the steam flow in the circumferential direction and applying a turning force to the blades 36. Thus, it is necessary to introduce the steam discharged from the nozzles into the rotor blades 36 effectively in order to raise the efficiency of the geothermal turbine.

On the other hand, this geothermal steam includes water droplets and foreign substances, such as solid particles peculiar to the geothermal steam, which are heavier in density than the steam. These droplets and foreign substances are moved peripherally to the exit of the nozzle 19 by the effect of centrifugal force due to strong rotating flow of the steam. Consequently, many droplets and foreign substances are centrifuged just behind the nozzle exit to the periphery, that is, around a root portion 45 of the overhang 38 of the nozzle diaphragm outer ring 17.

Thus, in the geothermal turbine 10 shown in FIG. 1, sealing fins 41 are arranged on the periphery of the shroud 37 and opposed to the overhang 38 of the nozzle diaphragm outer ring 17, without forming sealing fins on the overhang 38 of the nozzle diaphragm outer ring 17. A plurality of sealing fins, that is, for example, a few sealing fins, are arranged on the outer periphery of the shrouds 37, appearing comb-like in section.

A small gap 40 is formed between the overhang 38 of the nozzle diaphragm outer ring 17 and the sealing fins 41 on the outer surface of the shrouds 37, and constitutes a steam sealing portion 44 at the tip of the rotor blade, and this steam sealing portion 44 forms structure for preventing steam leakage on the tip portion of the rotor blade. Moreover, the inner surface 38a of the overhang 38 of the nozzle diaphragm outer ring 17 is overlay welded or coated with a protective material having a durability greater than the material of the overhang 38, that is, a corrosion resistant material or an erosion resistant material, for preventing corrosion due to corrosive components included in the geothermal steam or erosion by droplets or solid particles included in the geothermal steam.

A preferred erosion resistant material or erosion resistant material for overlay welding is, for example, titanium, an alloy of cobalt (Co) as a principle ingredient, an alloy of chromium (Cr) or a mixture of chromium and iron (Fe) or mixture of chromium, iron and nickel (Ni) as principle ingredients, or an alloy of titanium (Ti) as a principle ingredient. Another preferred erosion resistant material for use as a coating is, for example, an alloy with cobalt as a principle ingredient, an alloy of chromium (Cr) or mixture of chromium, iron and nickel as principle ingredients, a composition of chromium such as chromium carbide, a composition of titanium such as titanium nitride, or a composition of tungsten (W) such as tungsten carbide, is suitably used. A preferable corrosion resistant material, or corrosion resistant material for use as overlay welding is, for example, an alloy of chromium as a principle ingredient, an alloy of nickel as a principle ingredient, an alloy of mixture of chromium, nickel and iron as principle ingredients, an alloy of titanium as a principle ingredient, or an alloy of cobalt as a principle ingredient. As the corrosion resistant material for use as a coating, there is preferred, for example, an alloy of chromium as a principle ingredient, an alloy of nickel as a principle ingredient, an alloy of a mixture of chromium, nickel and iron as principle ingredients, an alloy of titanium as a principle ingredient, an alloy of cobalt as a principle ingredient, or a composition of chromium, tungsten and titanium.

Moreover, overlay welding may be applied by welding such as plasma powder welding or shielded metal arc welding, with a cement made by mixing a carbide such as tungsten carbide (WC), chromium carbide (CrC), niobium carbide (NbC) or vanadium carbide (VC) or a boride such as titanium boride ($TiB_2$) into the above-mentioned corrosion resistant materials or the above-mentioned erosion resistant materials. Also, coating may be applied by plasma spraying such as atmospheric plasma spraying (APS), or high velocity frame spraying such as high-velocity oxy-fuel (HVOF) spraying or high-pressure high-velocity oxy-fuel (HP-HVOF) spraying, with one of the above-mentioned metal substances or cermet as a spraying powder material. The particle diameter of the powder of the erosion resistant materials, or the corrosion resistant materials, or the carbide or the boride forming the cermet, is desirably 20 to 75 micrometers. If the particle diameter is larger than 75 micrometers, the microstructure of the sprayed metal becomes rough, and there may be some of particles which cannot be melted completely, and this presents an issue of durability of the sprayed portion. On the other hand, particles, finer than 20 micrometers in diameter are not desirable in terms of the difficulty of adjusting the spraying.

By arranging the steam sealing portion 44 in this construction, the water droplets and foreign particles discharged at the root portion 45 are pushed on the inner surface 38a of the overhang 38 and rotate due to the strong swirling flow of the steam, without staying at the overhang 38a because there are no obstacles damming the flow on the inner surface 38a of the overhang 38, and thus, the water droplets and solid particles flow along the smooth inner surface 38a of the overhang 38 and can be smoothly discharged into the exit of the turbine stage. They can then be captured by a drain catcher. Therefore, the root portion 45 of the nozzle diaphragm outer ring 17 is not significantly damaged due to erosion. If the overhang 38 is worn out, the gap between the tip of the sealing fins 41 on the outer surface of the shroud 37 and the overhang 38 of the nozzle diaphragm outer ring 17 would be enlarged, and this would cause a factor of age deterioration of the turbine efficiency; however, in this invention, the overlay welding or the coating on the inner surface 38a of the overhang 38 with the above-mentioned protective material having a durability greater than the material of the overhang 38, that is, the corrosion resistant material of the erosion resistant material is resistant against water droplets, corrosive components or solid particles, and aging wear-out of the geothermal turbine can be prevented. Thus, the turbine efficiency can be sustained at a high level over a long period of time.

In addition, an annular gap 40 is formed between the tip of the shroud fin 41 on the tip of the rotor blades 15 and the inner surface 38a of the overhang 38 of the nozzle diaphragm outer ring 17; however, this gap 40 is almost the same size as one in the conventional structure. And in this embodiment, discharge holes for the foreign substance on the overhang 38 of the nozzle diaphragm outer ring 17 is not necessary, and thus there is not an additional loss due to steam leaking through the discharge holes to the turbine stage exit 47 as is the case in the conventional structure. As a result, the turbine efficiency can be raised based on this design.

Moreover, since water droplets thrown out to the inner surface of the overhang 38 of the nozzle diaphragm outer ring 17 becomes a water coat covering the inner surface 38a of the overhang 38 by the effect of centrifugal force, this has the effect of narrowing the gap 40 to the extent of thickness of a water film, and thus the amount of steam leakage can be further decreased. Reduction of the steam leakage contributes to the improvement of the efficiency of the turbine.

Figure 2:
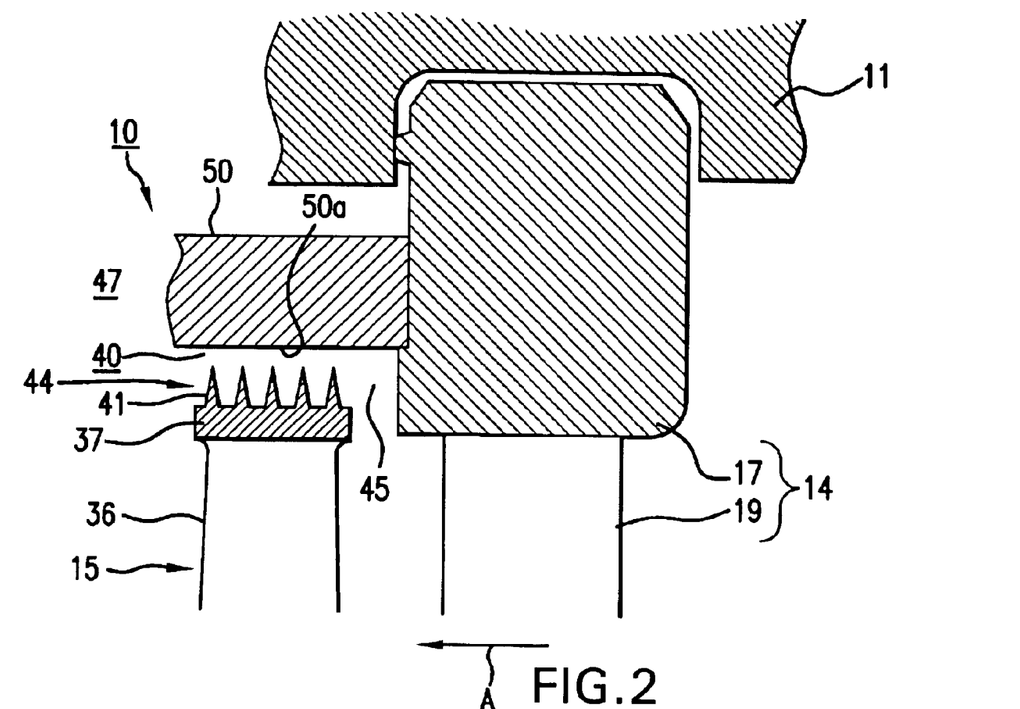
FIG. 2 is a sectional view showing a steam sealing structure of a tip of a rotor blade in a first modified example of the turbine stage shown in FIG. 1.

FIG. 2 shows a first modified example of the first embodiment of the structure for preventing steam leakage at the tip of the rotor blade of the geothermal turbine. In the structure shown in FIG. 2, an overhang 50 of the nozzle diaphragm outer ring 17 is formed as a cylindrical body apart from the body of the nozzle diaphragm outer ring 17, and this cylindrical body is tied and integrated on the whole by attachment means such as bolts. The overhang 50 of the nozzle diaphragm outer ring 17 is constituted in the shape of a cylinder, a sleeve ring, or torus. The overhang 50 is manufactured with the corrosion resistant material or the erosion resistant material. By making the overhang 50 from substances having excellent resistance against corrosion or erosion, the erosion due to water droplets and solid particles or the corrosion due to corrosive components on an inner surface 50a of the overhang 50 (constituting a steam sealing portion 44) can be effectively prevented.

If the overhang 50 is damaged due to operation of the geothermal turbine 10 for a long period, the overhang 50 can be easily replaced, and thus the ease of maintaining the turbine equipment can be raised. Since the overhang 50 is made as a single body, there are many options of materials for the overhang 50, and materials can be selected and changed as it is suitable for conditions of the geothermal steam at each site. Moreover, the advantages of the geothermal turbine 10 shown in FIG. 1 can be attained. The other aspects of this embodiment are substantially the same as the one shown in FIG. 1, and therefore a detailed explanation thereof is omitted.

Figure 3:
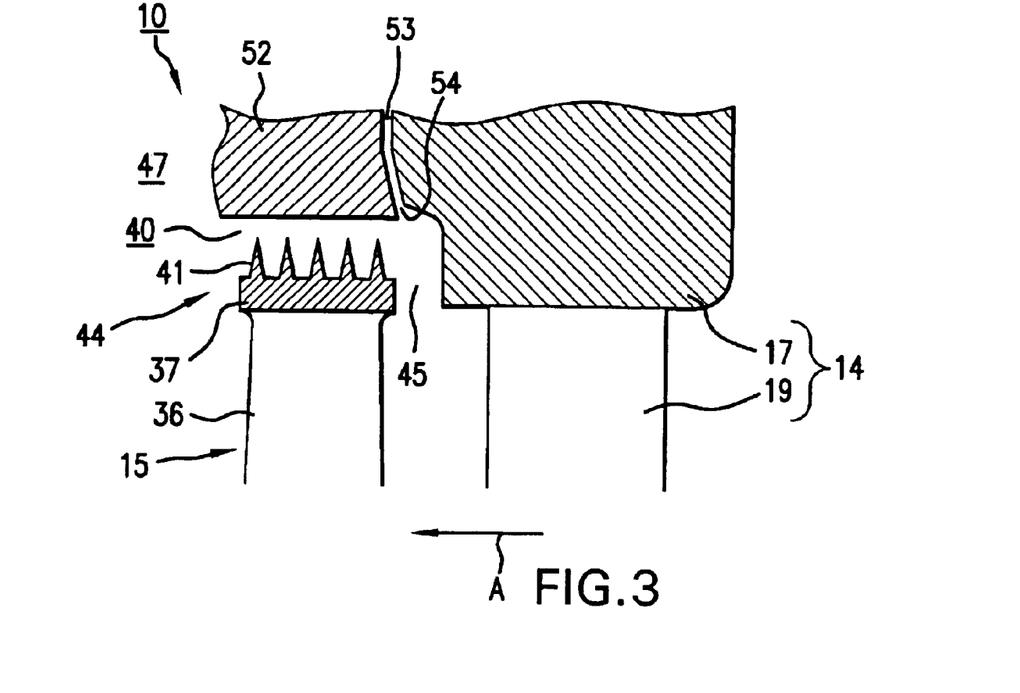
FIG. 3 is a sectional view showing a steam sealing structure of a tip of a rotor blade in a second modified example of the turbine stage shown in FIG. 1.

FIG. 3 shows a second modified example of the first embodiment of the structure for preventing steam leakage at the tip of the rotor blades of the geothermal turbine. In this modified example, an overhang 52 of the nozzle diaphragm outer ring 17 is formed as a cylindrical body apart from the body of the nozzle diaphragm outer ring 17, and a minute slit 53 is arranged between the nozzle diaphragm outer ring 17 and the overhang 52. This slit 53 has the function of discharging water droplets and solid particles into the exit 47 of the turbine stage without passing through the gap 40.

The slit formation portion 54 is arranged on the nozzle diaphragm outer ring 17, and the outer surface of this slit formation portion 54 is overlay welded or coated with the above-mentioned protective material having a durability, that is, the corrosion resistant material or the erosion resistant material for preventing damage due to water droplets or foreign substances. This overlay welding or coating may be partial, and it is not necessary to be formed over all the surface of the slit formation portion 54. As for the geothermal turbine, this slit 53 is effective for protecting the sealing fins 41 of the steam sealing portion 44 and also the steam passage from damage in case there is a high concentration of foreign substances, such as solid particles, in the geothermal steam. Similar to a case shown in FIG. 2, the overhang 52 is manufactured, at least a part, from the above-mentioned protective material, that is, the erosion resistant material or the corrosion resistant material, and the same advantages as of the geothermal turbine 10 shown in FIG. 2 can be attained.

Second Embodiment

Figure 4:
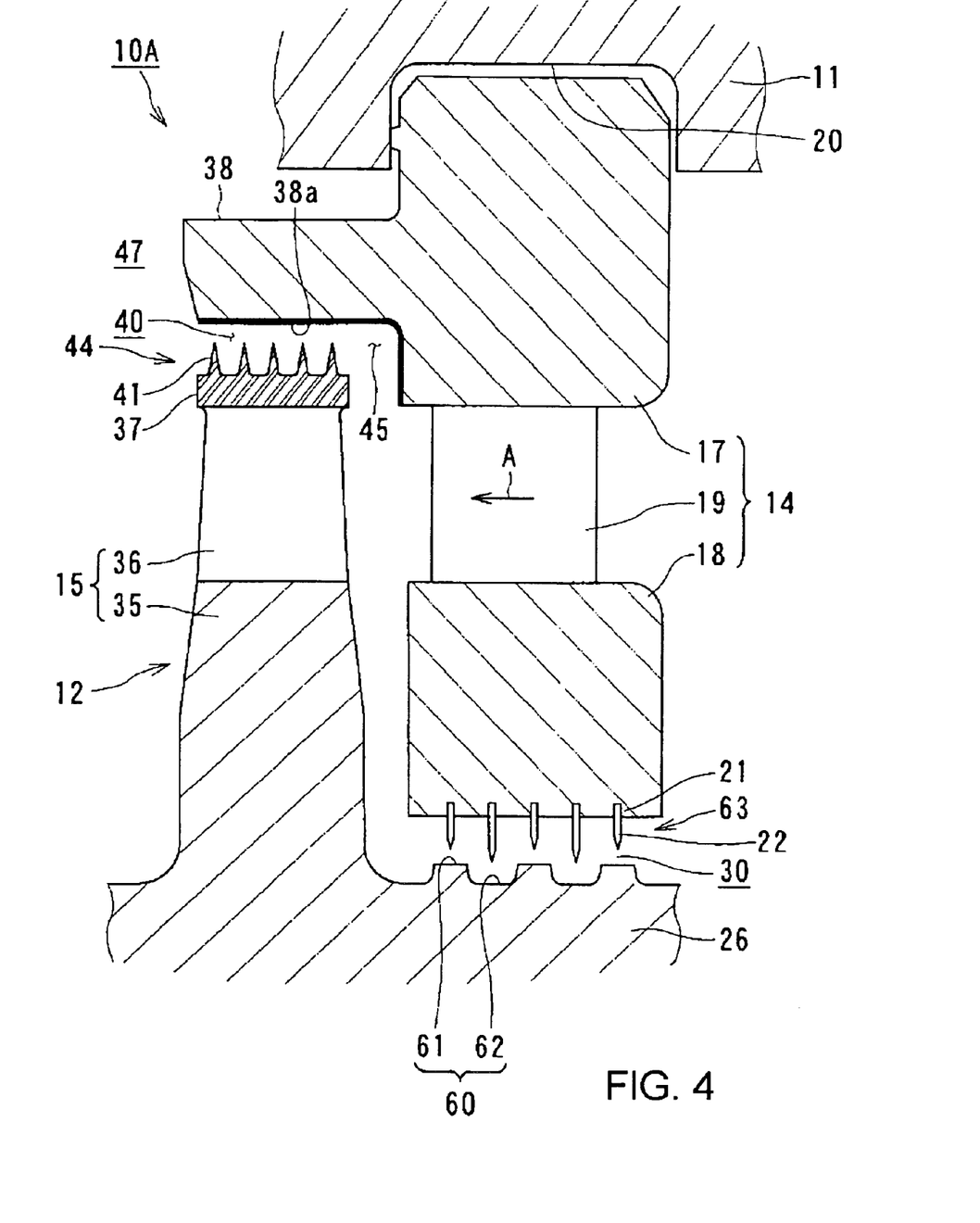
FIG. 4 is a sectional view showing a turbine stage of a geothermal turbine of a second embodiment in this invention.

FIG. 4 is a sectional view showing a geothermal turbine of a second embodiment in this invention. The geothermal turbine 10A shown in FIG. 4 has a different structure for preventing steam leakage of the turbine rotor shaft 26 from the geothermal turbine 10 from that shown in FIG. 1. However, the other components of the geothermal turbine 10A are actually the same as those of the geothermal turbine 10, and a detailed explanation of these components is omitted. The same reference numerals are used as in FIG. 1.

In the structure for preventing steam leakage on the turbine rotor shaft 26 shown in FIG. 4, sealing fin attachment portions 21 are arranged on an inner periphery of the nozzle diaphragm inner ring 18, and a plurality of sealing fins 22 are attached to these sealing fin attachment portions 21, appearing comb-like in section in a circumferential direction. Moreover, a high-and-low groove 60 is formed around the entire circumference of the surface of the turbine rotor shaft 26. The high-and-low groove 60 is constituted by a plurality of convex portions 61 extending along a circumferential direction and a plurality of concave portions 62 arranged between the convex portions 61. Each of the convex portions 61 is formed trapezoidal in section, as shown in FIG. 4, so that it tapers odd radially outside at the tip. By arranging the convex portion 61 trapezoidal in section, each of the concave portions 62 is also made trapezoidal or dished in section. Moreover, it is also possible that this high-and-low groove 60 is formed trapezoidal or semicircular or some other part-circular or part-elliptical or arched section.

A gap 30 is formed between the sealing fins 22 arranged on the inner circumferential side of the nozzle diaphragm inner ring 18 and the high-and-low groove 60 on the outer surface of the turbine rotor shaft 26, and this gap 30 constitutes a steam sealing portion 63 of labyrinth structure. This steam sealing portion 63 forms a structure for preventing steam leakage on the turbine rotor shaft 26, which effectively prevents the steam leakage passing through the gap 30. At least one surface of the high-and-low groove 60 of the steam sealing portion 63 is covered with the above-mentioned protective material, that is, the corrosion resistant material or erosion resistant material. By arranging the high-and-low groove 60 trapezoidal in section, the collision angle of the water droplets or solid particles, entrained by the high-speed steam passing through the gap 30 of the steam sealing portion 63, toward a side face of the trapezoid of the groove 60 is minimized. Thus, the collision energy that the high-and-low groove 60 receives is decreased compared to a conventional case of a perpendicular collision, and abrasion of the high-and-low groove 60 is also reduced. Moreover, by arranging the high-and-low groove 60 trapezoidal in section, the spraying application of a coating material onto all the surfaces of the high-and-low groove 60, including side faces of the convex portion, can be effectively, firmly and smoothly performed.

A general method for coating on the surface of metals is to spray heated particles of the coating material onto the metal surface with high speed, and it is necessary to keep the spray angle onto the metal surface around 90° to ensure good adhesion. The shape of a conventional high-and-low groove cannot satisfy this condition and cannot perform fine coating because the side face of the convex portion 28 is perpendicular to the rotor shaft as shown in FIG. 11. However, the high-and-low groove 60 of the rotor shaft 26 shown in FIG. 4 has a trapezoidal shaped in section, and thus in this embodiment, fine coating can be realized.

Leakage steam passing through this gap 30 bypasses the nozzles 19 and flows through the steam sealing portion 63; however, this leakage steam does not contribute any work of the turbine stage 12 and may become a factor decreasing the turbine efficiency. Thus, by adopting a labyrinth structure for the steam sealing portion 63, the steam leakage can be effectively prevented.

In addition, this structure for preventing steam leakage can be applied not only between the rotor shaft 26 and the nozzle diaphragm inner ring 18 but also a gland packing portion in which the turbine rotor shaft 26 penetrates the turbine casing 11. Moreover, FIG. 4 shows an example of the structure for preventing steam leakage applied to the turbine rotor shaft 26 of the geothermal turbine 10 shown in FIG. 1; however, this structure for preventing steam leakage can be also combined with the structure for preventing steam leakage of the blade tip portion shown in FIG. 2 or FIG. 3.

Figure 5:
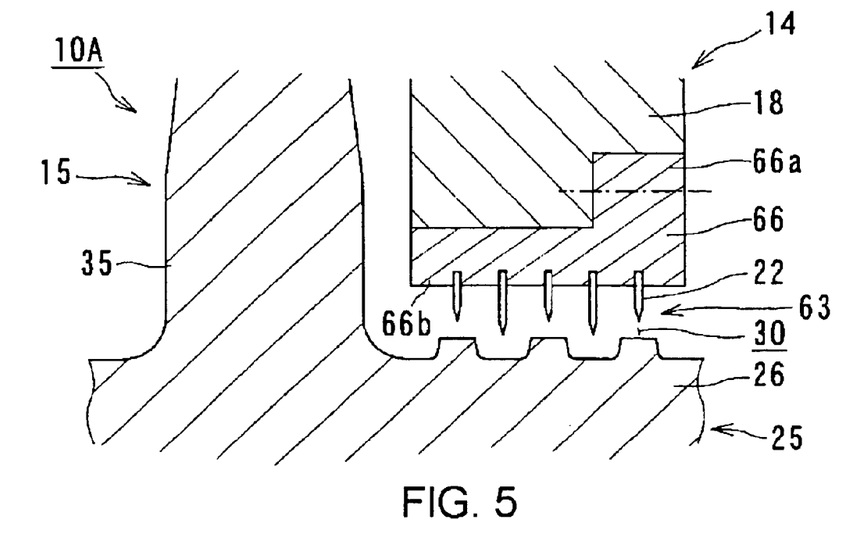
FIG. 5 is a sectional view showing a steam sealing structure of a rotor shaft portion of a turbine rotor of a geothermal turbine in this invention.

FIG. 5 shows a modified example of the geothermal turbine of this embodiment in the invention. This modified example is different from the structure for preventing steam leakage of the turbine rotor shaft shown in FIG. 4, but the other structure of this example is substantially the same as that in FIG. 4, and therefore a detailed explanation thereof is omitted. In the structure for preventing steam leakage of the turbine rotor shaft 26 shown in FIG. 5, a detachable sealing fin segment 66 is composed of a separate body from the nozzle diaphragm inner ring 18 that is connected to the nozzle diaphragm inner ring 18 and integrated on the whole by attachment means such as bolts, and this sealing fin segment can be both attached and detached. The detachable sealing fin segment 66 equipped with a mounting flange 66a is formed in the shape of a cylinder, a torus or a sleeve ring, manufactured with the erosion resistant material or corrosion resistant material.

The structure of this modified example, except for the detachable sealing fin segment 66 as a separate piece on an inner periphery of the nozzle diaphragm inner ring 18, is not substantially different from the structure for preventing steam leakage of the turbine rotor shown in FIG. 4. In the geothermal turbine 10A, water droplets or solid particles are contained in the steam passing through the steam sealing portion 63. In the conventional structure for preventing steam leakage shown in FIG. 11, water droplets and solid particles contained in the steam passing through a gap of the steam sealing portion collide with the convex portion of the high-and-low groove 8a of the rotor shaft 8 and afterwards scatter by the effect of centrifugal force and collide with the inner surface 9a of the nozzle diaphragm inner ring 9. Thus, the inner periphery of the nozzle diaphragm inner ring 9 is damaged. If a root of the sealing fin 9b is implanted In an inner periphery of the nozzle diaphragm inner ring 9, is damaged, the sealing fin 9b drops out, and thus the efficiency of the turbine falls significantly.

However, in the structure for preventing steam leakage of the turbine rotor 25 shown in FIG. 5, the detachable sealing fin segment 66 is attached on an inner periphery of the nozzle diaphragm inner ring 18, and the detachable fin segment 66 is removable and made, at least partly, from the protective material, that is, the material having excellent resistance against erosion and/or corrosion attack. Thus, the detachable sealing fin segment 66, with excellent material characteristics, prevents the inner surface 66b, on which the sealing fin 22 is attached, from being exposed by erosion due to water droplets or solid particles or corrosion due to corrosive components.

Even if the steam sealing portion receives damage due to long-term operation of the geothermal turbine 10A, the sealing fins can be easily replaced by detaching this detachable sealing fin segment 66, and thus the maintainability of the turbine equipment is improved. Since the detachable sealing fin segment 66 is made as a single body, there are many options for the materials of the sealing fin segment 66, and combined with the rotor shaft 26 structure shown in FIG. 4, the reliability of the steam sealing portion 63 of the turbine rotor shaft can be maintained for a long time.

In the structure of preventing steam leakage of the rotor shaft 26 of the turbine rotor 25 shown in FIGS. 4 and 5, the high-and-low groove 60 is shown in the exemplary form of trapezoidal section in the axial direction on the outer surface of the rotor shaft 26; however, the cross section of the high-and-low groove 60 may have other shapes, e.g., a convex portion and/or a concave portion of the form of arc, half-circle, semicircle, half-oval, semi-oval, half-ellipse, or semi-ellipse.

In the geothermal turbine 10, the turbine inlet stages, namely, the first, second and third turbine stages are forced to operate under especially severe operating conditions. That is, firstly, they are affected by corrosive components contained in the geothermal steam. Corrosive components contained in the geothermal steam are active in the temperature range of between 180 to 200° C., and the operating temperature of the steam at one of the turbine inlet stages of the geothermal turbine 10 is present at this active temperature range during expansion, and thus the relevant range is under a very corrosive condition. Secondly, these stages are affected by solid particles. Generally, a strainer (not illustrated) is installed at the inlet of the turbine in order to prevent foreign substances, such as the solid particles, from entering the geothermal turbine 10, and ordinarily the strainer has four or five meshes per inch, so that relatively large solid particles never come into the geothermal turbine.

However, if the condition of a geothermal well is not good and a high concentration of solid particles is included in the steam, the above-mentioned finer mesh becomes clogged up soon, and thus, a courser strainer having only two meshes per inch is must be used. Large particles passed through this strainer having a large mesh directly hit the nozzles of the turbine inlet stages, and may cause damage due to the collision and/or erosion. In the turbine inlet stages, the more severe corrosive environment worsens the damages. Moreover, with the use of two meshes per inch, there is the possibility that relatively large particles having a diameter up to 12 millimeters pass through and thus the conventional nozzles having smaller throat width of 5 to 8 millimeters may be blocked up.

Figure 6:
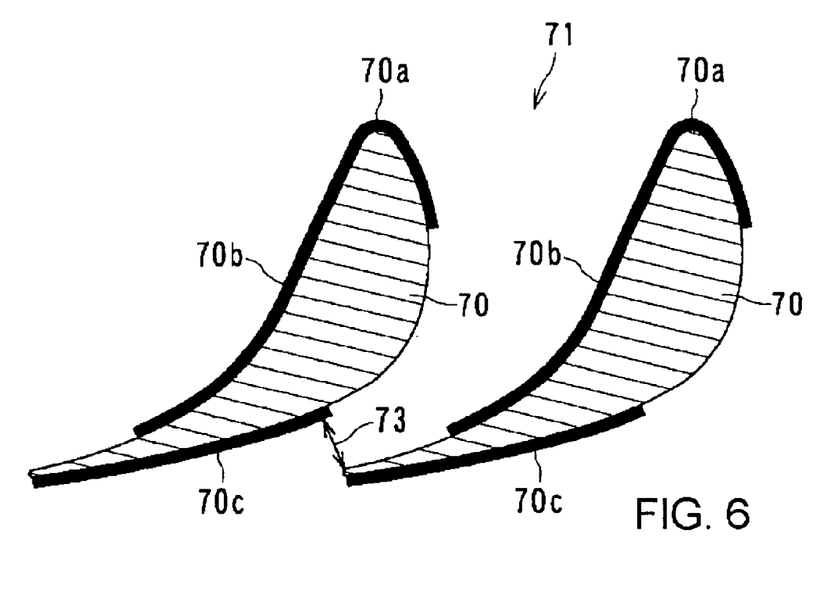
FIG. 6 is a schematic view showing nozzles of a geothermal turbine in this invention.

In the geothermal turbine of one embodiment of this invention, nozzles 70 used in the turbine inlet stages are arranged as shown in FIG. 6. The chord length of each nozzle 70 constituting a nozzle cascade 71 is at least twice as large as a conventional one, and the throat width at the nozzle exit formed between adjacent nozzles is set as ½ inch or more. When each nozzle forming nozzle cascade is designed as shown in FIG. 6 and the throat width at the nozzle exit is arranged to be ½ inch or more, consequently, the throat width 73 of the nozzle 70 is equal to or more than the mesh size of the strainer, the nozzle cannot be blocked up even with the largest particles passing through the mesh of the strainer.

When nozzles 70 having a relatively large pitch and a relatively large chord length are adopted for the nozzle cascade 71, the number of the nozzles becomes relatively small, and it gets difficult for the lower modes of the natural frequencies of the rotor blades to avoid resonance with NPF (a product of the number of nozzles and the rotational frequency of the rotor shaft). However, for example, excellent damping characteristics against vibratory excitation can be obtained by combining the nozzles 70 with snubber blades, which have integral shrouds on the tip of the rotor blades and the side faces of the shroud are being pressure contacted to the adjacent ones each other, and thus the blades being continuously coupled 360 degrees, therefore, the contact between adjacent shrouds limits the amplitude of vibration and produces high damping when stimulating steam forces work.

Figure 7:
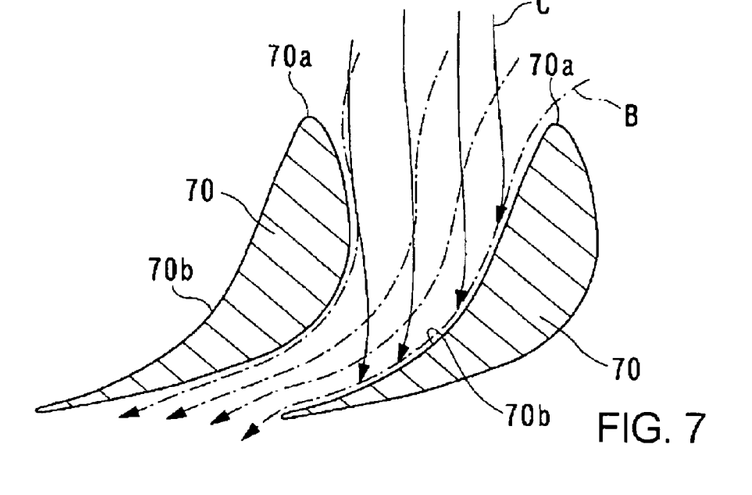
FIG. 7 is a schematic diagram showing flow behavior around the nozzles shown in FIG. 6.

FIG. 7 is a drawing for explaining steam flow and the behavior of solid particles passing through the nozzle cascade. The geothermal steam guided into the geothermal turbine 10 flows around the nozzles 70 as shown by dashed line B. On the other hand, water droplets and solid particles contained in the steam flow as shown in solid line C due to the large density. They intensively collide with the leading edge 70a through the concave side 70b of the nozzle, giving erosion damage in this area. On the other hand, the boundary layer flow on the convex side of the nozzle gradually progresses and becomes thicker at the trailing edge. In a lower layer portion of the boundary layer close to the wall, steam velocity is quite low due to viscosity of the fluid, and as a result, that portion is always covered with condensed water containing corrosive elements. In the upper layer part of the boundary layer, however, flow velocity is as fast as the main flow, and thus a vortex flow is generated due to the interaction of such low and fast flows. This vortex flow causes interaction of the corrosive components and solid particles, and thus, the trailing edge of the convex side is exposed to a condition that can easily cause damage due to erosion and/or corrosion.

This embodiment is focused on this point. In the inlet stages of the geothermal turbine 10 shown in FIG. 6, all of the surface of the nozzle 70, or at least a part of the surface from the leading edge 70a to the concave side 70b of the nozzle 70, which can be easily damaged due to erosion based on collision of the droplets or the solid particles, and the trailing edge portion 70c of the convex side, which can be easily damaged by corrosion due to the corrosive components retained in the water film of the boundary layer 76, is coated with a material having excellent corrosion resistance and/or erosion resistance. By coating at least necessary part of the surface of the nozzle 70 with the material having excellent corrosion resistance and/or erosion resistance, the nozzle has the function of protecting the surface from attacks of both the solid particles and the corrosive components and maintaining the shape of the nozzle for a long time.

Figure 8:
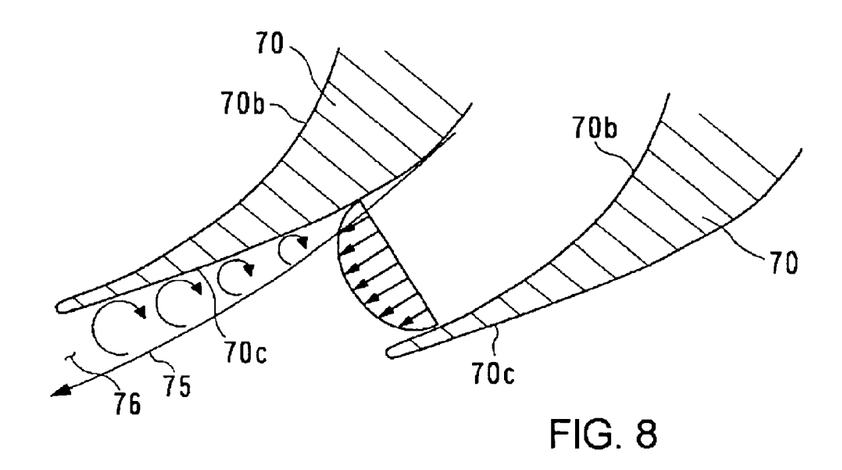
FIG. 8 is a schematic diagram showing flow behavior on a trailing edge side of the nozzles shown in FIG. 6.

As for the nozzle 70 shown in FIG. 6 having a size larger than twice the size of the conventional one, even if scales are deposited on the surface of the nozzle, the reduction of the throat width 73 due to the scale is minute, and reduction in swallowing capacity is also minute. Thus, the decrease of output over time due to the scale deposit on the steam passage can be minimized, and stable operation can be maintained for a long time. Failures in surface roughness and profile shape of the nozzles due to erosion and/or corrosion damages, observed in a conventional technique, cause not only deterioration of reliability but also significant degradation of the efficiency of the turbine. Accordingly, the coating of the surface of the nozzle 70 as shown in FIGS. 6 through 8, for preventing degradation of the efficiency, contributes heavily to protection for energy resources.

Third Embodiment

Figure 9:
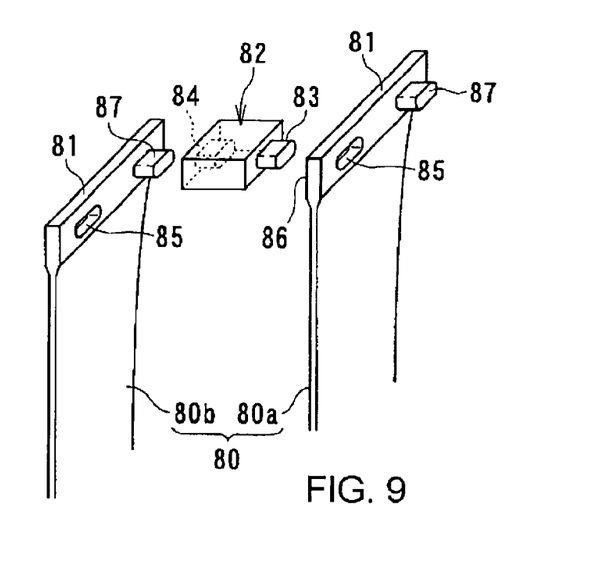
FIG. 9 is a perspective view showing a connection structure for rotor blades of a geothermal turbine in this invention.

FIG. 9 shows a third embodiment of a geothermal turbine according to this invention. FIG. 9 shows connection structure of a tip of a rotor blade, which is suitable for the turbine latter stages having relatively long blades. In this connection structure of the tip portion of the rotor blade, tip portions 81, 81 of the rotor blades 80a, 80b, which are adjacent each other, are connected with a cover piece 82. This cover piece 82 has a block configuration such as a rhombus or a parallelogram. A tenon 83 protrudes on one side of the cover piece 82, and a tenon hole 84 is formed on a counter side of the cover piece 82 opposite to the side from which tenon 83 protrudes. The tenon 83 protruded from one side of the cover piece 82 is inserted into a tenon hole 85 bored in a tip portion of the rotor blade 80a and is fixed by deforming the top of the tenon 83. Alternatively, the tenon 83 may be fixed by inserting tightly into the tenon hole 85 of the tip portion of the rotor blade 80a.

In case of the deforming of the top of the tenon 83, the deformed top of the tenon completely covers and closes the periphery of the tenon hole 85, and the side of the cover piece 82 adhered closely to a flat portion of an inlet side 86 of the tenon hole 85 closes the tenon hole 85, which prevents the corrosive components from entering into an inner face of the tenon hole 85. In the case of tight insertion of the tenon 83 into the tenon hole 85, the side of the cover piece 82 also adheres closely to the flat portion of an inlet side 86 of the tenon hole 85, which prevents the corrosive components from entering into an inner face of the tenon hole 85. A tenon 87 formed on a tip portion 81 of the rotor blade 80b is loosely inserted into a tenon hole 84 formed on a surface opposite to a tenon 83 side of the cover piece 82.

In this constitution, by sequentially connecting adjacent blades 80a, 80b, . . . , of the rotor blades 80 through the cover pieces 82, all of the blades 80a, 80b, . . . , mounted along the circumferential direction of the turbine rotor shaft are loosely connected to each other, and thus the rotor blades 80 constitute, so called continuous loose coupling 360 degrees around the wheel. This structure of the continuous loose coupling around the wheel provides excellent damping characteristics of the rotor blade against vibration. By applying materials having excellent corrosion resistance and erosion resistance to the cover pieces 82, corrosion inside the tenon hole 84, which is loosely assembled, and erosion due to droplets can be prevented. This connection structure achieves advantages in comparison to the conventional connection structures shown in FIGS. 12 to 13 operating in a corrosive environment, and enables stable cycling load operation of the geothermal turbine for a long time.

Figures 10A, 10B:
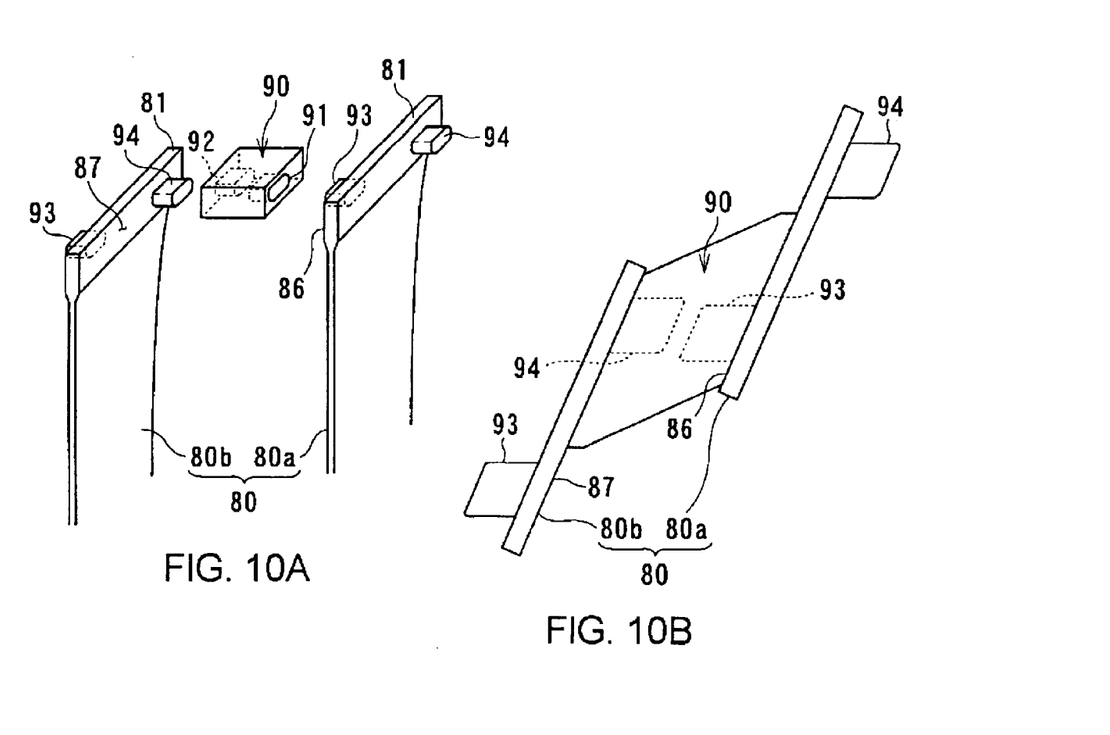
FIG. 10A and FIG. 10B are perspective views showing connection structure for rotor blades of a geothermal turbine modified vis-a-vis the example shown in FIG. 9.

FIGS. 10A and 10B show a modified example of the connection structure of the rotor blade according to this embodiment. FIG. 10A is a perspective view, and FIG. 10B is a drawing viewed from the top of the blade. This connection structure of rotor blades shown in this modified example is also composed of blades 80a, 80b, which are adjacent each other, of the rotor blades 80, and a cover piece 90 connecting tip portions 81 of the blades 80a, 80b. The cover piece 90 is formed in a block figuration, such as a rhombus or a parallelogram, and tenon holes 91, 92 are formed on both sides of the cover piece 90 facing each other.

On the other hand, tenons 93, 94 protrude on the sides facing each other of the tip portion 81 of each of the blades 80a, 80b of the rotor blades 80, and these tenons 93, 94 are loosely inserted into the tenon holes 91, 92 of the cover piece 90, respectively. As explained above, by sequentially connecting tip portions 81 of blades 80a, 80b, . . . , of the rotor blades 80 through the cover pieces 82, all of the blades 80a, 80b, . . . , of the rotor blades 80 in the circumferential direction are loosely connected to each other, and thus the rotor blade 80 constitutes, so called continuous loose coupling 360 degrees around the wheel. This structure of the continuous loose coupling around the wheel provides excellent damping characteristics of the rotor blade against vibration. By applying the above-mentioned protective material, having excellent corrosion resistance and erosion resistance, to the cover pieces 90, corrosion inside the tenon holes 91, 92, which are loosely assembled, and erosion due to droplets can be prevented. Similar to the connection structure shown in FIG. 9, this connection structure achieves advantages in corrosive environment, and enables stable cycling load operation of the geothermal turbine for a long time.

In addition, in FIGS. 9, 10A and 10B, "loosely" designates a situation in which movement according to, for example, vibration of adjacent blades is not restricted. The tenon hole contacts with the tenon to some extent, and the movement is attenuated by friction of the tenon and the tenon hole. On the other hand, "tightly" designates a situation in which the tenon inserted into the tenon hole cannot be extracted by forces equivalent to vibration of the blade, i.e., the blade vibrates together with the cover piece as one body, and a relatively intensive force is necessary to extract the tenon from the tenon hole.

Although the geothermal turbine of this invention is operated under severe conditions in which steam includes corrosive components, water droplets and solid particles, this invention improves corrosion resistance and erosion resistance of the turbine structural components, such as turbine rotor shaft, nozzles, rotor blades, and steam sealing structure between stationary parts and rotating parts, significantly decreases aging deterioration of such components, and enables high efficiency operation and extends the lives of the turbine.

Moreover, the structure for preventing steam leakage formed between stationary parts, such as the nozzles, and rotating parts, such as the rotor blades, significantly decreases aging deterioration brought about by foreign substances in the geothermal steam, effectively prevents damage, problems and the degradation in the efficiency of the turbine, enables stable operation of the geothermal turbine for a long time and promotes more effective use of energy resources for stable electric power supplies.

Furthermore, maintainability of turbine components of the geothermal turbine operated under severe conditions can be improved, and thus, occasions of shut down for maintenance, inspection and repair of the turbine components and emergency shut down due to troubles are decreased, and the operational availability of the geothermal turbine plant can thereby be raised. And since reliability at cycling load operation of the geothermal turbine improves, whereby operational flexibility of the turbine plant increases, the plant can be operated efficiently. Thus, saving and effective use of geothermal resources can be realized.

The foregoing discussion discloses and describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention.

What is claimed is:

1. A geothermal turbine, comprising:

a turbine casing;

a turbine rotor shaft;

a plurality of nozzle diaphragm outer rings fixed to the turbine casing;

a plurality of nozzle diaphragm inner rings located radially inside the nozzle diaphragm outer rings;

a plurality of nozzles placed between the nozzle diaphragm outer rings and the nozzle diaphragm inner rings, which form a steam passage;

a plurality of rotor blades mounted on the turbine rotor shaft, which face the nozzles and form a blade cascade in a circumferential direction;

a shroud arranged on tip of the rotor blade;

an overhang attached to the nozzle diaphragm outer ring, which extends downstream of the nozzles and has an inner surface facing radially outside the shroud; and a plurality of sealing fins which protrude radially outward from the shroud and face the overhang, wherein at least a part of the inner surface of the overhang, including a flat part of the inner surface facing directly across from at least a part of the plurality of sealing fins with a gap, is coated or overlay welded with a protective material.

2. The geothermal turbine as in claim 1, wherein the protective material has a durability greater than the material of the overhang.

3. The geothermal turbine as in claim 1, wherein the protective material comprises at least one of titanium, an alloy of cobalt, an alloy of titanium, an alloy of chromium, an alloy of chromium and iron, or an alloy of chromium, iron and nickel.

4. The geothermal turbine as in claim 1, wherein the protective material includes a cermet made by mixing carbide or boride and at least one of titanium, an alloy of cobalt, an alloy of titanium, an alloy of chromium, an alloy of chromium and iron, or an alloy of chromium, iron and nickel.

5. The geothermal turbine as in claim 1, wherein the coating or overlay welding is performed by at least one of plasma welding, shielded metal arc welding, atmospheric plasma spraying, high-velocity oxy-fuel spraying or high-pressure high-velocity oxy-fuel spraying.

6. The geothermal turbine as in claim 1, wherein the overhang are detachably attached to the nozzle diaphragm outer ring.

7. The geothermal turbine as in claim 6, further comprising a slit arranged between the overhang and the nozzle diaphragm outer ring, connecting between steam passage and an exit of the turbine stage.

8. The geothermal turbine as in claim 7, wherein at least a part of a surface of the slit is coated or overlay welded with a protective material.

9. The geothermal turbine as in claim 8, wherein the protective material comprises at least one of titanium, an alloy of cobalt, an alloy of titanium, an alloy of chromium, an alloy of chromium and iron, or an alloy of chromium, iron and nickel.

10. The geothermal turbine as in claim 8, wherein the coating or overlay welding is performed by at least one of plasma welding, shielded metal arc welding, atmospheric plasma spraying, high-velocity oxy-fuel spraying or high-pressure high-velocity oxy-fuel spraying.

* * * * *